United States Patent Office 2,816,142
Patented Dec. 10, 1957

2,816,142

PROCESS FOR THE PRODUCTION OF CYCLOHEXANONE OXIME

Lorraine Guy Donaruma, Woodbury, N. J., assignor to E. I. du Pont de Nemours and Company, Wilmington, Del., a corporation of Delaware No Drawing. Application May 10, 1955,
Serial No. 507,485

5 Claims. (Cl. 260—566)

The present invention relates to an improved process for the production of a caprolactam intermediate and, more particularly, to an improved process for the production of cyclohexanone oxime.

Ketoximes, particularly cycloalkanone oximes, have long been used as intermediates in the preparation of amides and lactams. For example, cyclohexanone oxime, the most important member of this class, has served as an intermediate for the preparation of caprolactam which is produced by Beckmann rearrangement of the oxime. It has also previously been known to produce the cyclohexanone oxime and other cycloalkanone and alkanone oximes by treatment of the appropriate nitrocycloalkane or nitro alkane salts with stannous chloride and strong mineral acid. The use of the less expensive ferrous chloride as the reducing agent has also been mentioned in the literature, but low conversions to the desired oximes and high conversions to the undesired ketones were experienced with the use of the ferrous salt. Nevertheless, because ferrous chloride is a cheap, readily available reagent, the need has long been felt for a process wherein ferrous salts could be used to produce cycloalkanone oximes in high yield from nitro cycloalkane salts without the attendant formation of large amounts of the undesired ketones.

Accordingly, an object of the present invention is to provide an improved, economical process for the production of a caprolactam intermediate. Another object of the present invention is to provide an efficient process for the production of cyclohexanone oxime wherein the formation of large quantities of undesirable by-product is avoided. A still further object of the present invention is to provide a simple, economical process for the conversion of water-soluble salts of nitrocyclohexane to a useful product. Other objects will become apparent as the invention is further described.

I have found that the foregoing objects may be achieved and the disadvantages of the prior processes overcome when I introduce separately into a reaction zone containing a concentrated solution of a mineral acid, an aqueous solution of an alkali metal salt of nitrocyclohexane, and a ferrous salt at rates such that the molar ratio of the ferrous salt to the salt of nitrocyclohexane is maintained at all times between 1.7 to 1 and 2.5 to 1.

In accordance with the process of the present invention, into a reaction zone containing a solution of a concentrated mineral acid, e. g., sulfuric acid or hydrochloric acid, are introduced separately an aqueous solution of an alkali metal salt of nitrocyclohexane, e. g., the potassium salt, and a ferrous salt, e. g., ferrous chloride, the rate of introduction of each being so regulated that the mole ratio of the ferrous salt to the salt of nitrocyclohexane in the reaction zone is maintained at all times between 1.7 to 1 and 2.5 to 1 and the temperature being maintained between about 20 and 70° C.

The following examples serve to illustrate specific embodiments of the method of carrying out the process of the present invention. However, they will be understood to be illustrative only and not to limit the invention in any manner. The parts given in the examples are parts by weight.

Example 1

To 75 parts of 37% hydrochloric acid were added continuously solid ferrous chloride tetrahydrate and a 2.9 M solution of the potassium salt of nitrocyclohexane, the rates of addition being such that the molar ratio of the ferrous salt to the nitrocyclohexane salt was maintained at 2 to 1 and the temperature was held between about 20 and about 30° C. After 40 parts of the ferrous chloride tetrahydrate and 17 parts of the potassium nitrocyclohexane had been added, the pH of the reaction mixture was regulated to 5–6 by the addition of ammonia. The reaction mixture then was extracted continuously for several hours with ether. The extract was dried, concentrated, and the concentrate was extracted with 20% sulfuric acid. The pH of the acid extract was adjusted to 5–6, and the product was removed by filtration. The filtrate was extracted with ether to obtain additional product. Cyclohexanone oxime was obtained in the amount of 8.4 parts, a yield of 74%.

Example 2

A 2.5 M solution of ferrous chloride tetrahydrate and a 2.9 M solution of the potassium salt of nitrocyclohexane were added continuously to 75 parts of 37% hydrochloric acid, at a temperature between 20 and 30° C., the rates of addition of the two solutions being so regulated that the mole ratio of the ferrous salt to the potassium salt was 1.7 to 1. After 39.6 parts of the ferrous salt and 16.6 parts of the nitrocyclohexane salt had been added, the pH of the reaction mixture was adjusted to 5–6. When the work-up method employed in the run of Example 1 was used, there was obtained 6.0 parts (53% yield) of cyclohexanone oxime.

Example 3

Solid ferrous chloride tetrahydrate and a 2.9 M solution of potassium nitrocyclohexane were added continuously to 75 parts of 37% hydrochloric acid at about 20 to 30° C. at a rate such that the molar ratio of the ferrous salt to the nitrocyclohexane salt was maintained to 2.5 to 1. After 50 parts of the ferrous salt and 17 parts of the potassium nitrocyclohexane had been added, the pH of the reaction mixture was adjusted to 5–6, and the mixture was worked up as in Example 1. Cyclohexanone oxime was obtained in the amount of 6.2 parts (55% yield).

Example 4

A 2.2 M solution of the potassium salt of nitrocyclohexane and solid ferrous chloride tetrahydrate were added continuously and simultaneously to 75 parts of 37% hydrochloric acid at 20–30° C. The additions were regulated to keep the molar ratio of the ferrous salt to the potassium salt at 2.3 to 1. After 40 parts of the ferrous salt and 17 parts of the potassium nitrocyclohexane had been added, the pH of the reaction mixture was adjusted to about 6. The reaction mixture was treated according to the method of Example 1. Cyclohexanone oxime was obtained in the amount of 9.1 parts, a yield of 80%.

Example 5

To 113 parts of 24 N sulfuric acid were added continuously solid ferrous chloride tetrahydrate and a 2.9 M solution of the potassium salt of nitrocyclohexane at a rate such that the molar ratio of the ferrous salt to the nitrocyclohexane salt was maintained at 2 to 1 and the temperature of the reaction mixture was held between about 25 and about 40° C. When 40 parts of the ferrous salt and 17 parts of the potassium nitrocyclohexane had been added, the pH of the reaction mixture was adjusted to about 5 and the reaction mixture was worked up by the method of Example 1. Cyclohexanone oxime in the amount of 6.0–6.4 parts, a yield of 53–57%, resulted.

*Example 6*

A mixture of 13 parts (0.1 mole) of nitrocyclohexane and 6 parts (0.1 mole) of potassium hydroxide in 30 parts of water was added slowly at about 25–30° C. to a well-agitated mixture of 40 parts (0.2 mole) of ferrous chloride tetrahydrate in 75 parts of 37% hydrochloric acid. When the addition was complete, the pH of the reaction mixture was adjusted to about 4 by the addition of ammonia, and the mixture then was extracted continuously with ether for several hours. The extract was dried and the ether was removed by distillation under reduced pressure. The residue consisted of 4.5 parts (40% yield) of cyclohexanone oxime.

Cyclohexanone oxime was obtained in good yields (50% or greater) in the process of the invention when, as the runs of Examples 1 to 5 illustrate, the ferrous salt and the alkali metal salt of nitrocyclohexane were introduced into the reaction zone containing a concentrated solution of a mineral acid at rates such that the molar ratio of the ferrous salt to the salt of nitrocyclohexane was maintained throughout the introduction between 1.7 to 1 and 2.5 to 1. The maintenance of the ferrous salt to nitrocyclohexane salt molar ratio in this range throughout the introduction into the acid is critical in the present process. For example, Example 6 illustrates the relatively poor conversion to the oxime obtained in a run in which the final molar ratio of the ferrous salt to the nitrocyclohexane salt was 2 to 1 but in which the actual molar ratio of the ferrous salt to the nitrocyclohexane salt, as controlled by the rate of introduction of the nitrocyclohexane salt into the acid ferrous salt solution, was much greater than the range between 1.7 to 1 and 2.5 to 1 for the greater portion of the introduction period. While I do not wish to be limited by a discussion of the reactions which may occur in the present process, the presence at any time during the introduction of the reactants into the acid of a large excess of the ferrous salt over that theoretically required to effect reduction (2 moles per mole of the nitrocyclohexane salt) apparently causes hydrolysis of a considerable portion of the oxime formed. This hydrolysis would explain the relatively poor overall conversions to the oxime and the large amounts of ketone obtained both in the run of Example 6 and in prior processes in which the reducing agents were present in greater than stoichiometrically equivalent quantities during at least a portion of the reduction period.

The process of the present invention may be carried out at temperatures between about 20 and about 70° C. However, as the examples show, the use of a temperature range in which no external heating or cooling is required (20–30° C.) gave entirely satisfactory yields of the desired oxime, and this range is preferable from an economic standpoint. Temperatures above about 70° C. cause excessive decomposition of the product. The temperature range below 20° C. can be used in the present process but is generally not considered desirable because external cooling and increased reaction times are required.

The preceding examples additionally illustrate a method of recovering the cyclohexanone oxime prepared by the present process. For example, following the addition of the ferrous salt and the nitrocyclohexane salt to the reaction zone containing the concentrated solution of mineral acid, the pH of the reaction mixture can be adjusted by the addition of any suitable basic material to between about 2 and about 9 and the oxime recovered therefrom, e. g., by one or more extractions.

The process of the present invention is not limited to the materials employed in the foregoing examples. For example, sodium nitrocyclohexane can be employed. Likewise, the ferrous chloride can be replaced by other ferrous salts. The present process is not only applicable to the production of cyclohexanone oxime. For example, oximes of cyclopentanone, substituted cyclohexanones and cyclopentanones, cycloheptanone, acetone, and like ketoximes can be prepared, and, correspondingly, salts of nitrocyclopentane, substituted nitrocyclohexanes and nitrocyclopentanes, nitrocycloheptane, 2-nitropropane, and like nitro compounds can be used as starting materials.

The cyclohexanone oxime prepared by the process of the present invention is a valuable caprolactam intermediate. For example, the oxime can be rearranged to ε-caprolactam by a suitable rearrangement process, e. g., by the process taught in U. S. Patent 2,487,246, issued November 8, 1949. However, the use of the oxime product of the process of the present invention is not limited to the production of caprolactam. The cyclohexanone oxime prepared by the present process is also useful as a solvent, as an intermediate for chemical syntheses, and the like.

The invention has been described in detail in the foregoing. It will be apparent to those skilled in the art that many variations can be introduced without departing from the scope of the invention. I intend, therefore, to be limited only by the following claims.

I claim:

1. A process which comprises introducing separately into a reaction zone containing a concentrated aqueous solution of a mineral acid of the group consisting of sulfuric acid and hydrochloric acid an aqueous solution of an alkali metal salt of nitrocyclohexane and ferrous chloride, the rate of introduction of each being so regulated that the molar ratio of the ferrous salt to the salt of nitrocyclohexane present in said reaction zone is maintained at all times between 1.7 to 1 and 2.5 to 1.

2. The process as claimed in claim 1, wherein the alkali metal salt of nitrocyclohexane is the potassium salt of nitrocyclohexane.

3. A process for the production of cyclohexanone oxime which comprises introducing separately into a reaction zone containing a concentrated aqueous solution of a mineral acid of the group consisting of sulfuric acid and hydrochloric acid an aqueous solution of an alkali metal salt of nitrocyclohexane and ferrous chloride, the rate of introduction of each being so regulated that the molar ratio of the ferrous salt to the salt of nitrocyclohexane present in said reaction zone is maintained at all times between 1.7 to 1 and 2.5 to 1, and the temperature being maintained between about 20 and about 70° C.

4. A process for the production of cyclohexanone oxime which comprises introducing separately into a reaction zone containing a concentrated aqueous solution of a mineral acid of the group consisting of sulfuric acid and hydrochloric acid an aqueous solution of an alkali metal salt of nitrocyclohexane and ferrous chloride, the rate of introduction of each being so regulated that the molar ratio of the ferrous salt to salt of nitrocyclohexane in said reaction zone is maintained at all times between 1.7 to 1 and 2.5 to 1 and the temperature being maintained between about 20 and about 70° C., adjusting the pH of the reaction mixture to between about 2 and about 9 and thereafter recovering cyclohexanone oxime.

5. The process as claimed in claim 4, wherein the ferrous salt is introduced in the form of an aqueous solution.

References Cited in the file of this patent

FOREIGN PATENTS 977,099    France _____ Nov. 8, 1950

OTHER REFERENCES

Grundmann: "Angewandte Chem.," vol. 62 (1950), page 558.